US011581908B2

(12) United States Patent
Yamaguchi (10) Patent No.: US 11,581,908 B2
(45) Date of Patent: Feb. 14, 2023

(54) RADIO FREQUENCY MODULE AND COMMUNICATION DEVICE

(71) Applicant: Murata Manufacturing Co., Ltd., Kyoto (JP)

(72) Inventor: Yukiya Yamaguchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 241 days.

(21) Appl. No.: 16/910,156

(22) Filed: Jun. 24, 2020

(65) Prior Publication Data

US 2020/0328766 A1 Oct. 15, 2020

Related U.S. Application Data

(63) Continuation of application No. PCT/JP2018/045224, filed on Dec. 10, 2018.

(30) Foreign Application Priority Data

Dec. 25, 2017 (JP) .............................. JP2017-247116

(51) Int. Cl.
 *H04B 1/00* (2006.01)
 *H04B 1/16* (2006.01)
(52) U.S. Cl.
 CPC ........... *H04B 1/0078* (2013.01); *H04B 1/006* (2013.01); *H04B 1/0057* (2013.01); *H04B 1/1615* (2013.01)
(58) Field of Classification Search
 CPC .... H04B 1/0078; H04B 1/0057; H04B 1/006; H04B 1/1615; H04B 1/18
 See application file for complete search history.

(56) References Cited

U.S. PATENT DOCUMENTS 5,999,065 A * 12/1999 Furutani ................... H01P 1/15
 333/204
2001/0027119 A1* 10/2001 Furutani ................ H03H 7/463
 455/553.1

(Continued)

FOREIGN PATENT DOCUMENTS

JP  H0555857 A  3/1993
JP  H09200077 A  7/1997

(Continued)

OTHER PUBLICATIONS

International Search Report issued in Application No. PCT/JP2018/045224, dated Feb. 5, 2019.

(Continued)

*Primary Examiner* — Jinsong Hu
*Assistant Examiner* — Rui M Hu
(74) *Attorney, Agent, or Firm* — Pearne & Gordon LLP (57) ABSTRACT

A radio frequency module includes a first terminal, a second terminal, a third terminal, a first switching circuit, a bandpass filter, a first band elimination filter, and a first wiring conductor. The first switching circuit switches between a connection between a first switch terminal and a second switch terminal and a connection between the first switch terminal and a third switch terminal. The bandpass filter is disposed on a first signal path connecting the first terminal to the first switch terminal, and has a first passband. The first band elimination filter is disposed on a second signal path connecting the second switch terminal to the second terminal, and has a first elimination band included in the first passband. The first wiring conductor forms a third signal path connecting the third switch terminal to the third terminal.

4 Claims, 5 Drawing Sheets

(56) References Cited

U.S. PATENT DOCUMENTS

| | | | | |
|---|---|---|---|---|
| 2002/0186757 | A1* | 12/2002 | Nakamura | H04B 1/0057 370/282 |
| 2006/0135195 | A1* | 6/2006 | Leinonen | H04B 1/0057 455/78 |
| 2007/0082622 | A1* | 4/2007 | Leinonen | H04B 15/00 455/132 |
| 2008/0166980 | A1* | 7/2008 | Fukamachi | H04B 1/0057 455/83 |
| 2008/0174470 | A1* | 7/2008 | Lum | H04B 7/0845 342/16 |
| 2008/0212552 | A1* | 9/2008 | Fukamachi | H04B 1/006 370/343 |
| 2011/0206165 | A1 | 8/2011 | Satou et al. | |
| 2013/0016633 | A1* | 1/2013 | Lum | H04B 1/16 370/297 |
| 2013/0169333 | A1 | 7/2013 | Oshima | |
| 2014/0035699 | A1* | 2/2014 | Zeng | H04B 1/0057 333/132 |
| 2014/0044022 | A1* | 2/2014 | Matsuo | H04B 1/006 370/278 |
| 2014/0055210 | A1* | 2/2014 | Black | H04B 1/525 333/132 |
| 2014/0112213 | A1* | 4/2014 | Norholm | H04B 1/56 370/277 |
| 2015/0236798 | A1* | 8/2015 | Nobbe | H03F 3/195 370/278 |
| 2016/0044677 | A1* | 2/2016 | King | H04B 1/40 455/450 |
| 2016/0294435 | A1 | 10/2016 | Laurila | |
| 2017/0063411 | A1* | 3/2017 | Ripley | H04B 1/18 |
| 2017/0063412 | A1* | 3/2017 | Ripley | H04B 1/18 |
| 2017/0302243 | A1 | 10/2017 | Horita | |
| 2017/0353287 | A1 | 12/2017 | Onaka et al. | |
| 2018/0062682 | A1* | 3/2018 | Wloczysiak | H03F 3/19 |
| 2018/0226946 | A1* | 8/2018 | Kim | H04B 1/0057 |
| 2018/0226947 | A1* | 8/2018 | Baek | H03H 9/547 |
| 2018/0226948 | A1* | 8/2018 | Sung | H03H 9/587 |
| 2019/0007073 | A1* | 1/2019 | King | H04B 1/0057 |
| 2019/0044548 | A1* | 2/2019 | Freisleben | H04B 1/0057 |
| 2019/0181839 | A1* | 6/2019 | Bauder | H03H 7/463 |
| 2019/0181890 | A1* | 6/2019 | Schmidhammer | H04B 1/006 |
| 2019/0181907 | A1* | 6/2019 | Pfann | H03H 9/02007 |
| 2020/0169240 | A1* | 5/2020 | Cheon | H03H 9/6483 |
| 2021/0159925 | A1* | 5/2021 | Mori | H04B 1/0067 |

FOREIGN PATENT DOCUMENTS

| | | |
|---|---|---|
| JP | 2006108824 A | 4/2006 |
| JP | 2010109757 A | 5/2010 |
| JP | 2013141057 A | 7/2013 |
| JP | 2016538786 A | 12/2016 |
| WO | 2016076093 A1 | 5/2016 |
| WO | 2016129401 A1 | 8/2016 |

OTHER PUBLICATIONS

Written Opinion issued in Application No. PCT/JP2018/045224, dated Feb. 5, 2019.

* cited by examiner

RADIO FREQUENCY MODULE AND COMMUNICATION DEVICE

This is a continuation of International Application No. PCT/JP2018/045224 filed on Dec. 10, 2018 which claims priority from Japanese Patent Application No. 2017-247116 filed on Dec. 25, 2017. The contents of these applications are incorporated herein by reference in their entireties.

BACKGROUND OF THE DISCLOSURE

1. Field of the Disclosure

The present disclosure relates to a radio frequency module and a communication device.

2. Description of the Related Art

Japanese Unexamined Patent Application Publication No. 2013-141057 discloses a frontend module including a switch, a first bandpass filter, and a second bandpass filter. The switch includes a first terminal, a second terminal, and a third terminal. The first bandpass filter is connected to the second terminal and has a first passband. The second bandpass filter is connected to the third terminal and has a second passband. The frontend module is compatible with multiband communication using multiple communication bands through switching.

A bandpass filter needs to provide attenuation in multiple relatively-wide frequency bands. Therefore, such a bandpass filter has trap circuits whose number easily increases compared with other types of filters, and easily increases in size compared with other filters. A module having multiple bandpass filters described above has a disadvantage in terms of reduction in size.

BRIEF SUMMARY OF THE DISCLOSURE

Accordingly, it is an object of the present disclosure to provide a radio frequency module which is compatible with multiband communication and which achieves a reduction in size.

A radio frequency module according to an aspect of the present disclosure includes a first terminal, a second terminal, a third terminal, a first switching circuit, a bandpass filter, a first band elimination filter, and a first wiring conductor. The first switching circuit includes a first switch terminal, a second switch terminal, and a third switch terminal. The bandpass filter is disposed on a first signal path connecting the first terminal to the first switch terminal, and has a first passband. The first band elimination filter is disposed on a second signal path connecting the second switch terminal to the second terminal, and has a first elimination band. The first wiring conductor forms a third signal path connecting the third switch terminal to the third terminal. The first switching circuit switches between a connection between the first switch terminal and the second switch terminal and a connection between the first switch terminal and the third switch terminal. The first elimination band is included in the first passband.

A communication device according to an aspect of the present disclosure includes the radio frequency module and an RF-signal processing circuit that is connected to the radio frequency module.

The present disclosure provides a radio frequency module which is compatible with multiband communication and which achieves a reduction in size, and also provides a communication device using such a radio frequency module.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Embodiments of the present disclosure will be described in detail below by using the drawings. The embodiments described below indicate comprehensive or concrete examples. The numeric values, shapes, materials, components, component arrangement and connection configuration, and the like, which are indicated by the embodiments below, are exemplary, and are not intended to limit the present disclosure. Among components in the embodiments below, components which are not described in the independent claims are described as optional components.

First Embodiment

A radio frequency module according to a first embodiment is compatible with multiband communication using a first communication band and a second communication band, which have different frequency bands, through switching, and switches, by using a switching circuit, between multiple signal paths through which a signal in a different communication band is made to pass selectively. The first communication band and the second communication band may be in conformity with different wireless communication standards. Each communication band may be a single communication band, or a communication band set constituted by multiple communication bands included in the same frequency band.

Figure 1:
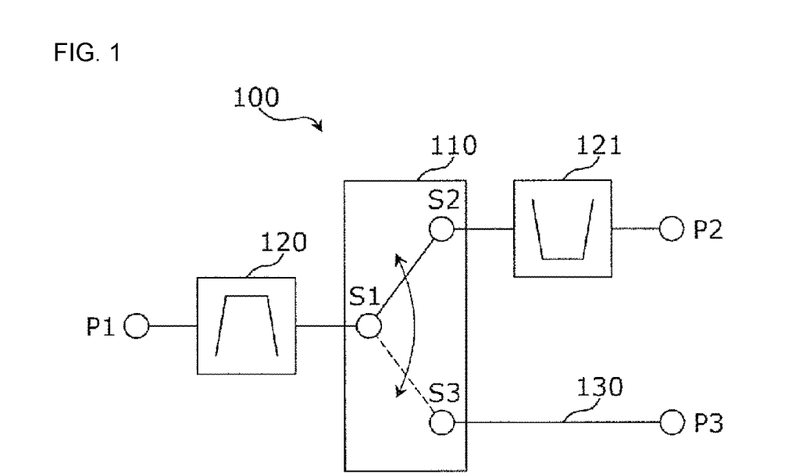
FIG. 1 is a block diagram illustrating an exemplary functional configuration of a radio frequency module according to a first embodiment.

FIG. 1 is a block diagram illustrating an exemplary functional configuration of a radio frequency module according to the first embodiment. As illustrated in FIG. 1, a radio frequency module 100 includes a first terminal P1, a second terminal P2, a third terminal P3, a first switching circuit 110, a bandpass filter 120, a first band elimination filter 121, and a first wiring conductor 130.

The first switching circuit 110, which includes a first switch terminal S1, a second switch terminal S2, and a third switch terminal S3, switches between a connection between the first switch terminal S1 and the second switch terminal S2 and a connection between the first switch terminal S1 and the third switch terminal S3.

The bandpass filter 120 is disposed on a first signal path connecting the first terminal P1 to the first switch terminal S1. The first band elimination filter 121 is disposed on a second signal path connecting the second switch terminal S2 to the second terminal P2. The first wiring conductor 130 forms a third signal path connecting the third switch terminal S3 to the third terminal P3.

The first switching circuit 110 switches between connections between the switch terminals in accordance with the communication band that is to be used in multiband communication. The first switching circuit 110 may switch between connections between the switch terminals, for example, in accordance with a control signal (not illustrated) provided from an external circuit.

Thus, the first signal path and the second signal path are used as a signal path through which a signal in the first communication band is made to pass selectively. The first signal path and the third signal path are used as a signal path through which a signal in the second communication band is made to pass selectively.

Figure 2:
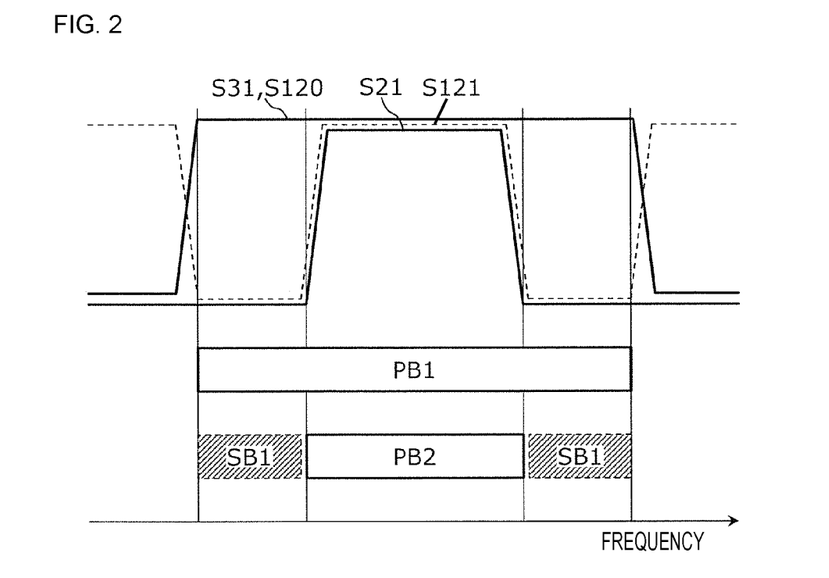
FIG. 2 is a schematic diagram illustrating exemplary bandpass characteristics of a radio frequency module according to the first embodiment.

FIG. 2 is a schematic diagram illustrating exemplary bandpass characteristics of the radio frequency module 100. FIG. 2 schematically illustrates bandpass characteristics S21 between the first terminal P1 and the second terminal P2, bandpass characteristics S31 between the first terminal P1 and the third terminal P3, bandpass characteristics S120 of the bandpass filter 120, bandpass characteristics S121 of the first band elimination filter 121.

The passband of the bandpass filter 120 is denoted as a first passband PB1. The elimination band of the first band elimination filter 121 is denoted as a first elimination band SB1. The first elimination band SB1 is included in the first passband PB1.

The passband from the first terminal P1 to the third terminal P3 is substantially equal to the first passband PB1.

The passband from the first terminal P1 to the second terminal P2 is substantially equal to a second passband PB2 which is a frequency band of the first passband PB1 minus the first elimination band SB1.

Thus, the radio frequency module 100 may be used in selection of signals for each communication band in the multiband communication in which the first passband PB1 is used as the frequency band of the first communication band and the second passband PB2 is used as the frequency band of the second communication band.

The radio frequency module 100 uses a band elimination filter with which the radio frequency module 100 is made smaller than one using a bandpass filter, achieving a radio frequency module smaller than one using bandpass filters whose number is equal to the number of supported communication bands.

Second Embodiment

A radio frequency module according to a second embodiment is compatible with multiband communication using the first communication band, the second communication band, and a third communication band, which have different frequency bands, through switching, and switches, by using a switching circuit, between multiple signal paths through which a signal in a different communication band is made to pass selectively. The first communication band, the second communication band, and the third communication band may be in conformity with different wireless communication standards. Each communication band may be a single communication band, or a communication band set constituted by multiple communication bands included in the same frequency band.

Figure 3:
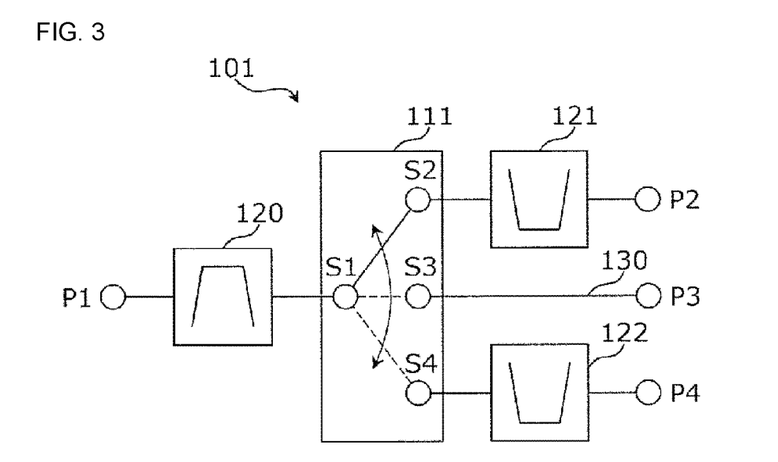
FIG. 3 is a block diagram illustrating an exemplary functional configuration of a radio frequency module according to a second embodiment.

FIG. 3 is a block diagram illustrating an exemplary functional configuration of a radio frequency module according to the second embodiment. As illustrated in FIG. 3, a radio frequency module 101 has a configuration obtained by adding a fourth terminal P4 and a second band elimination filter 122 to the radio frequency module 100 in FIG. 1 and changing the first switching circuit 110 to a first switching circuit 111. Hereinafter, components equivalent to those in the first embodiment are designated with the identical reference characters, and, when appropriate, will not be described. The differences between the first embodiment and the second embodiment will be described mainly.

The first switching circuit 111 has a configuration of the first switching circuit 110 plus a fourth switch terminal S4. The first switching circuit 111 switches between a connection between the first switch terminal S1 and the second switch terminal S2, a connection between the first switch terminal S1 and the third switch terminal S3, and a connection between the first switch terminal S1 and the fourth switch terminal S4.

The second band elimination filter 122 is disposed on a fourth signal path connecting the fourth switch terminal S4 to the fourth terminal P4.

Figure 4:
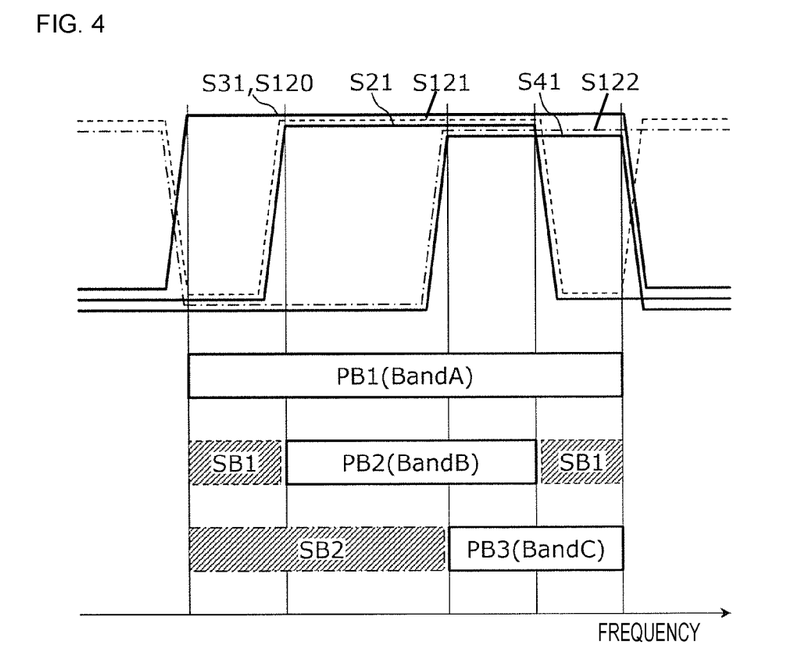
FIG. 4 is a schematic diagram illustrating exemplary bandpass characteristics of a radio frequency module according to the second embodiment.

FIG. 4 is a schematic diagram illustrating exemplary bandpass characteristics of the radio frequency module 101. FIG. 4 schematically illustrates the bandpass characteristics S21 between the first terminal P1 and the second terminal P2, the bandpass characteristics S31 between the first terminal P1 and the third terminal P3, bandpass characteristics S41 between the first terminal P1 and the fourth terminal P4, the bandpass characteristics S120 of the bandpass filter 120, the bandpass characteristics S121 of the first band elimination filter 121, and bandpass characteristics S122 of the second band elimination filter 122.

The passband of the bandpass filter 120 is denoted as the first passband PB1. The elimination band of the first band elimination filter 121 is denoted as the first elimination band SB1. The elimination band of the second band elimination filter 122 is denoted as a second elimination band SB2.

The first elimination band SB1 and the second elimination band SB2 are different from each other. Both the first elimination band SB1 and the second elimination band SB2 are included in the first passband PB1.

The passband from the first terminal P1 to the third terminal P3 is substantially equal to the first passband PB1.

The passband from the first terminal P1 to the second terminal P2 is substantially equal to the second passband PB2 which is a frequency band of the first passband PB1 minus the first elimination band SB1.

The passband from the first terminal P1 to the fourth terminal P4 is substantially equal to a third passband PB3 which is a frequency band of the first passband PB1 minus the second elimination band SB2.

In the example in FIG. 4, the frequency band of the first passband PB1 minus the first elimination band SB1 (that is, the second passband PB2) overlaps the frequency band of the first passband PB1 minus the second elimination band SB2 (that is, the third passband PB3).

The radio frequency module 101 may be used to select signals for each of communication bands A, B, and C having the frequency ranges of the first passband PB1, the second passband PB2, and the third passband PB3 which are described above.

The radio frequency module 101 uses band elimination filters with which the radio frequency module 101 is made smaller than one using bandpass filters, achieving a radio frequency module smaller than one using bandpass filters whose number is equal to the number of supported communication bands.

The bandwidth of the frequency band of the first passband PB1 minus both the first elimination band SB1 and the second elimination band SB2 (that is, the overlapping frequency band between the second passband PB2 and the third passband PB3) is narrower than both of the following bandwidths: the bandwidth of the frequency band of the first passband PB1 minus the first elimination band SB1 (that is, the second passband PB2); and the bandwidth of the frequency band of the first passband PB1 minus the second elimination band SB2 (that is, the third passband PB3).

The narrow bandwidth of the overlapping frequency band between the second passband and the third passband causes degradation of insertion loss, which occurs due to the state in which a signal in the overlapping frequency band between passbands passes through an undesired signal path, to be suppressed.

The first passband PB1, the second passband PB2, and the third passband PB3 may be frequency ranges of specific communication bands defined, for example, in the Long Term Evolution (LTE) standard (for example, the frequency range, 2570 MHz-2620 MHz, of Band38 or the frequency range, 2300 MHz-2400 MHz of Band40).

Figure 5:
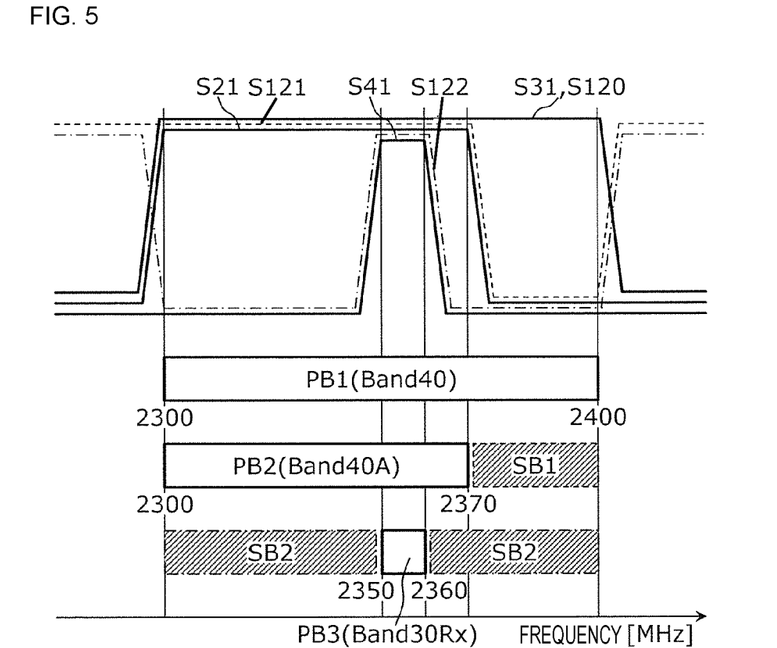
FIG. 5 is a schematic diagram illustrating exemplary bandpass characteristics of a radio frequency module according to the second embodiment.

FIG. 5 is a schematic diagram illustrating other exemplary bandpass characteristics of the radio frequency module 101. In FIG. 5, the frequency ranges of Band40, Band40A, and Band30 in the LTE standard are taken as a concrete example of the first passband PB1, the second passband PB2, and the third passband PB3.

That is, the first passband PB1 is the frequency band from 2300 MHz to 2400 MHz defined as Band40. The second passband PB2 is the frequency band from 2300 MHz to 2370 MHz which is partially operated in Band40. The third passband PB3 is the frequency band from 2350 MHz to 2360 MHz defined for the downstream of Band30.

In the example in FIG. 5, the frequency band of the first passband PB1 minus the first elimination band SB1 (that is, the second passband PB2) includes the entire frequency band of the first passband PB1 minus the second elimination band SB2 (that is, the third passband PB3).

Thus, the radio frequency module 101 may be used in selection of receive signals for each communication band, for example, in multiband communication using Band40 (the entire band), Band40A (a partial band), and Band30 in LTE.

Communication bands, which are identified by using the same number, may have different assigned frequency bands, for example, depending on the respective nations and regions or for the respective operation companies. For example, the frequency band of Band40 is not limited to 2300-2400 MHz described above, and may be 2300-2370 MHz. For example, the frequency band of Band40A is not limited to 2300-2370 MHz described above, and may be 2300-2360 MHz.

Figure 6:
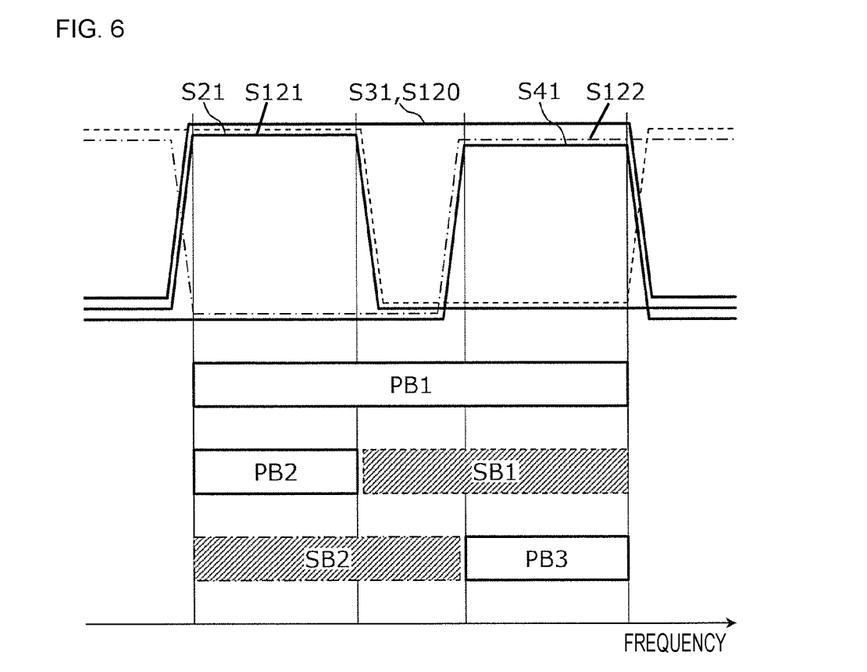
FIG. 6 is a schematic diagram illustrating exemplary bandpass characteristics of a radio frequency module according to the second embodiment.

FIG. 6 is a schematic diagram illustrating other exemplary bandpass characteristics of the radio frequency module 101. In the example in FIG. 6, there is no overlapping range between the frequency band of the first passband PB1 minus the first elimination band SB1 (that is, the second passband PB2) and the frequency band of the first passband PB1 minus the second elimination band SB2 (that is, the third passband PB3).

The radio frequency module 101 may be used to select signals in communication bands whose frequency ranges are the first passband PB1, the second passband PB2, and the third passband PB3 described above. In this case, there is no overlapping range between the second passband PB2 and the third passband PB3, causing degradation of insertion loss, which occurs due to the state in which a signal in the overlapping frequency band between passbands passes through an undesired signal path, to be suppressed.

Third Embodiment

A radio frequency module according to a third embodiment is compatible with multiband communication using the first communication band and the second communication band, which have different frequency bands, through switching, and switches, by using a switching circuit, between multiple signal paths through which a signal of different communication band is made to pass selectively. The first communication band and the second communication band may be in conformity with different wireless communication standards. Each communication band may be a single communication band, or a communication band set constituted by multiple communication bands included in the same frequency band.

Figure 7:
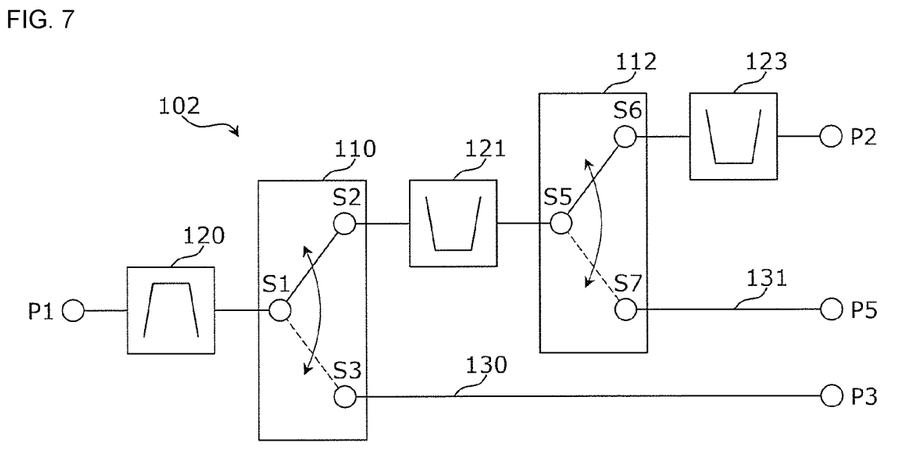
FIG. 7 is a block diagram illustrating an exemplary functional configuration of a radio frequency module according to a third embodiment.

FIG. 7 is a block diagram illustrating an exemplary functional configuration of a radio frequency module according to the third embodiment. As illustrated in FIG. 7, a radio frequency module 102 is a configuration of the radio frequency module 100 in FIG. 1 plus a fifth terminal P5, a second switching circuit 112, a third band elimination filter 123, and a second wiring conductor 131. Hereinafter, components equivalent to those in the first embodiment are designated with identical reference characters, and, when appropriate, will not be described. The differences between the first embodiment and the third embodiment will be described mainly.

The second switching circuit 112, which includes a fifth switch terminal S5, a sixth switch terminal S6, and a seventh switch terminal S7, switches between a connection between the fifth switch terminal and the sixth switch terminal and a connection between the fifth switch terminal and the seventh switch terminal.

The first band elimination filter 121 is connected between the second switch terminal S2 and the fifth switch terminal S5. The third band elimination filter 123 is connected between the sixth switch terminal S6 and the second terminal P2. The first band elimination filter 121 and the third band elimination filter 123 are disposed on the second signal path connecting the second switch terminal S2 to the second terminal P2. The first wiring conductor 130 forms the third signal path connecting the third switch terminal S3 to the third terminal P3. The second wiring conductor 131 forms a fifth signal path connecting the seventh switch terminal S7 to the fifth terminal P5.

Figure 8:
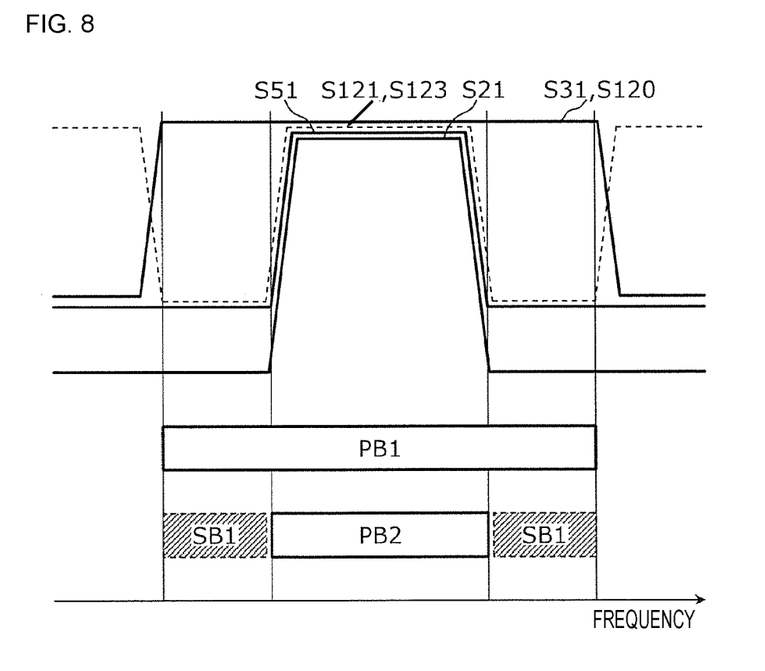
FIG. 8 is a schematic diagram illustrating exemplary bandpass characteristics of a radio frequency module according to the third embodiment.

FIG. 8 is a schematic diagram illustrating exemplary bandpass characteristics of the radio frequency module 102. FIG. 8 schematically illustrates the bandpass characteristics S21 between the first terminal P1 and the second terminal P2, the bandpass characteristics S31 between the first terminal P1 and the third terminal P3, bandpass characteristics S51 between the first terminal P1 and the fifth terminal P5, the bandpass characteristics S120 of the bandpass filter 120, and bandpass characteristics S121 and S123 of the first and third band elimination filters 121 and 123.

In the example in FIG. 8, as in the first band elimination filter 121, the third band elimination filter 123 has the first elimination band SB1. However, this example is not limiting. The third band elimination filter 123 may have any configuration as long as the third band elimination filter 123 has the same band as the first elimination band SB1 or has a third elimination band SB3 included in the first elimination band SB1.

This configuration enables easy adjustment of attenuation outside the passband by using two or more band elimination filters whose elimination bands match each other or one of which has an elimination band including the elimination band of the other filter.

Fourth Embodiment

A radio frequency module according to a fourth embodiment is compatible with multiband communication using the first communication band and the second communication band, which have different frequency bands, through switching, and switches, by using a switching circuit, between multiple signal paths through which a signal of a different communication band is made to pass selectively. The first communication band and the second communication band may be in conformity with different wireless communication standards. Each communication band may be a single communication band, or a communication band set constituted by multiple communication bands included in the same frequency band.

Figure 9:
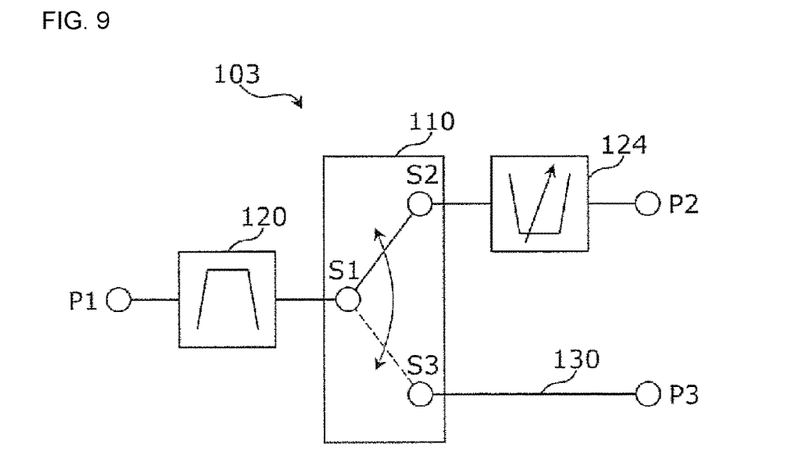
FIG. 9 is a block diagram illustrating an exemplary functional configuration of a radio frequency module according to a fourth embodiment.

FIG. 9 is a block diagram illustrating an exemplary functional configuration of a radio frequency module according to the fourth embodiment. As illustrated in FIG. 9, a radio frequency module 103 has a configuration in which the first band elimination filter 121 of the radio frequency module 100 in FIG. 1 is replaced with a variable band elimination filter 124.

This configuration enables a single configuration to be compatible with more types of communication bands.

As described above, the radio frequency modules compatible with multiband communication are described on the basis of the first to fourth embodiments. Each embodiment illustrates a radio frequency module including only one bandpass filter. However, this example is not limiting. The radio frequency module may include multiple bandpass filters. Such a radio frequency module has bandpass filters, whose number is equal to or less than the number of band elimination filters, as in the first to fourth embodiments. More preferably, the radio frequency module may have only one bandpass filter.

This exerts an effect of more reduction in size compared with the case in which a radio frequency module compatible with multiband communication has bandpass filters whose number is equal to the number of supported bands.

Fifth Embodiment

In a fifth embodiment, a communication device including the radio frequency module 100 according to the first embodiment will be described.

Figure 10:
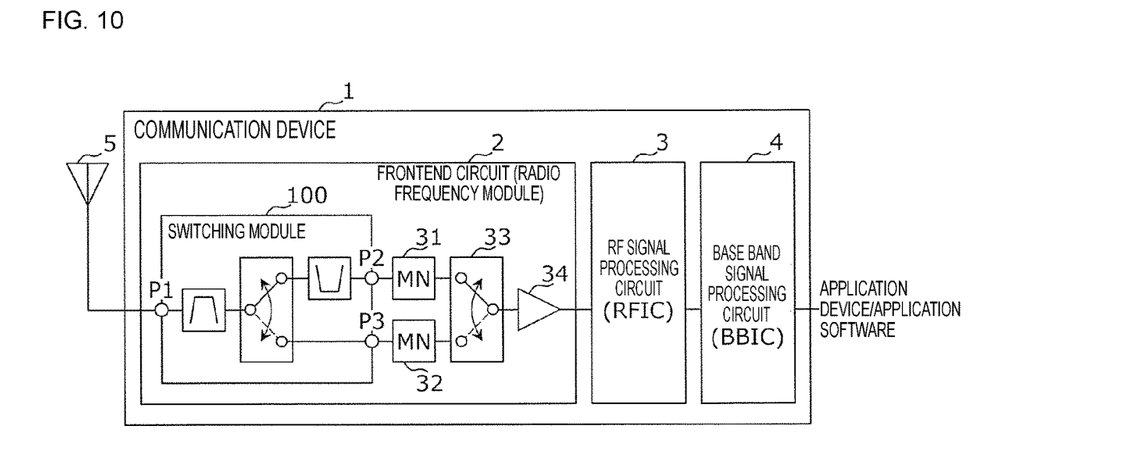
FIG. 10 is a block diagram illustrating an exemplary functional configuration of a communication device according to a fifth embodiment.

FIG. 10 is a block diagram illustrating an exemplary functional configuration of a communication device 1 according to the fifth embodiment. As illustrated in FIG. 10, the communication device 1 includes a frontend circuit 2, a radio frequency (RF)-signal processing circuit 3, and a base band signal processing circuit 4.

The frontend circuit 2 is compatible with multiband communication in which communication is performed by using multiple frequency bands selectively, and includes the radio frequency module 100, matching circuits 31 and 32, a switching circuit 33, and a low-noise amplifier 34.

A signal of a desired communication band included in a receive RF signal received by an antenna 5 is selected by the radio frequency module 100, and is received by the low-noise amplifier 34 through the matching circuits 31 and 32 and the switching circuit 33. The low-noise amplifier 34 amplifies the received signal, and supplies the amplified signal to the RF-signal processing circuit 3. The frontend circuit 2 may be formed of a radio frequency module including the radio frequency module 100.

The RF-signal processing circuit 3 converts the receive RF signal, which is received from the frontend circuit 2, into a receive signal, and supplies the resulting signal to the base band signal processing circuit 4. The conversion may involve demodulation and downconverting of a signal. The RF-signal processing circuit 3 may be formed of a radio frequency integrated circuit (RFIC) chip.

The base band signal processing circuit 4 coverts the receive signal, which is received from the RF-signal processing circuit 3, into receive data, and supplies the resulting data to an application device/application software. The conversion may involve expansion, demultiplexing, and error correction of data. The base band signal processing circuit 4 may be formed of a base band integrated circuit (BBIC) chip.

The application device/application software uses transmit data and receive data to perform application operations, such as a voice call and image display.

The communication device 1, which is capable of performing reception/transmission operations, is obtained by adding a known configuration (not illustrated) for signal transmission to the configuration in FIG. 10.

The communication device 1 using the radio frequency module 100 is not limiting. The communication device 1 may use any of the radio frequency modules 101 to 103 described above.

The communication device 1 uses any of the radio frequency modules 100 to 103 whose size may be reduced. Thus, a smaller communication device may be obtained.

The radio frequency modules and the communication device according to the embodiments of the present disclosure are described. However, the present disclosure is not limited to the individual embodiments. Without departing from the gist of the present disclosure, an embodiment obtained by making various changes, which are conceived by those skilled in the art, to the embodiments, and an embodiment constructed by combining components of different embodiments may be also included in one or more aspect scopes of the present disclosure.

CONCLUSION

As described above, a radio frequency module according to an aspect of the present disclosure includes a first terminal, a second terminal, a third terminal, a first switching circuit, a bandpass filter, a first band elimination filter, and a first wiring conductor. The first switching circuit includes a first switch terminal, a second switch terminal, and a third switch terminal. The bandpass filter is disposed on a first signal path connecting the first terminal to the first switch terminal, and has a first passband. The first band elimination filter is disposed on a second signal path connecting the second switch terminal to the second terminal, and has a first elimination band. The first wiring conductor forms a third signal path connecting the third switch terminal to the third terminal. The first switching circuit switches between a connection between the first switch terminal and the second switch terminal and a connection between the first switch terminal and the third switch terminal. The first elimination band is included in the first passband.

This configuration achieves the radio frequency module compatible with multiband communication in the first passband and the second passband which is a frequency band of the first passband minus the first elimination band. A band elimination filter, with which the radio frequency module may be made smaller than one using a bandpass filter, is used. Thus, compared with a configuration using bandpass filters whose number is equal to that of supported communication bands, the radio frequency module may be made smaller.

The radio frequency module may further include a fourth terminal and a second band elimination filter that has a second elimination band. The first switching circuit may further include a fourth switch terminal, and may switch between a connection between the first switch terminal and the second switch terminal, a connection between the first switch terminal and the third switch terminal, and a connection between the first switch terminal and the fourth switch terminal. The second band elimination filter may be disposed on a fourth signal path connecting the fourth switch terminal to the fourth terminal. The second elimination band may be included in the first passband, and may be a frequency band different from the first elimination band. A bandwidth of a frequency band of the first passband minus both the first elimination band and the second elimination band may be narrower than a bandwidth of a frequency band of the first passband minus the first elimination band and a bandwidth of a frequency band of the first passband minus the second elimination band.

This configuration achieves the radio frequency module compatible with multiband communication in the first passband, the second passband, and a third passband which is a frequency band of the first passband minus the second elimination band. A band elimination filter, with which the radio frequency module may be made smaller than one using a bandpass filter, is used. Thus, compared with a configuration using bandpass filters whose number is equal to that of supported communication bands, the radio frequency module may be made smaller.

In the radio frequency module, there may be no overlapping range between the frequency band of the first passband minus the first elimination band and the frequency band of the first passband minus the second elimination band.

This configuration causes degradation of insertion loss, which occurs due to the state in which a signal in the overlapping frequency band between passbands passes through an undesired signal path, to be suppressed because there is no overlapping range between the second passband and a third passband.

The radio frequency module may further include a fifth terminal, a second switching circuit, a third band elimination filter, and a second wiring conductor. The second switching circuit may include a fifth switch terminal, a sixth switch terminal, and a seventh switch terminal. The third band elimination filter may have a third elimination band which matches the first elimination band, or which is included in the first elimination band. The second wiring conductor may form a fifth signal path connecting the seventh switch terminal to the fifth terminal. The second switching circuit may switch between a connection between the fifth switch terminal and the sixth switch terminal and a connection between the fifth switch terminal and the seventh switch terminal. The first band elimination filter may be connected between the second switch terminal and the fifth switch terminal. The third band elimination filter may be connected between the sixth switch terminal and the second terminal.

This configuration facilitates adjustment of attenuation outside the passband by using two or more band elimination filters whose elimination bands match each other or one of which has an elimination band including the elimination band of the other filter.

In the radio frequency module, the first band elimination filter may be a variable band elimination filter.

This configuration enables the radio frequency module to be compatible with more types of communication bands.

In the radio frequency module, the radio frequency module may include bandpass filters and band elimination filters. The bandpass filters may be equal in number to the band elimination filters or may be less than the band elimination filters.

This exerts an effect of more reduction in size of the radio frequency module compatible with multiband communication, compared with a configuration using bandpass filters whose number is equal to that of supported bands.

A communication device according to an aspect of the present disclosure includes the radio frequency module and an RF-signal processing circuit that is connected to the radio frequency module.

This configuration achieves a smaller communication device by using a radio frequency module which may be made smaller.

The present disclosure may be used as a radio frequency module widely in various communication devices.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:
1. A radio frequency module comprising:
a first terminal;
a second terminal;
a third terminal;
a fifth terminal;
a first switching circuit that includes a first switch terminal, a second switch terminal, and a third switch terminal;

a second switching circuit that includes a fifth switch terminal, a sixth switch terminal, and a seventh switch terminal;

a bandpass filter that is disposed on a first signal path connecting the first terminal to the first switch terminal, the bandpass filter having a first passband;

a first band elimination filter that is disposed on a second signal path connecting the second switch terminal to the second terminal, the first band elimination filter having a first elimination band;

a third band elimination filter that has a third elimination band which matches the first elimination band or which is included in the first elimination band;

a first wiring conductor that forms a third signal path connecting the third switch terminal to the third terminal, a second wiring conductor that forms a fifth signal path connecting the seventh switch terminal to the fifth terminal, wherein the first switching circuit switches between a connection between the first switch terminal and the second switch terminal, and a connection between the first switch terminal and the third switch terminal, wherein the second switching circuit switches between a connection between the fifth switch terminal and the sixth switch terminal and a connection between the fifth switch terminal and the seventh switch terminal, wherein the first elimination band is included in the first passband, wherein the first band elimination filter is connected between the second switch terminal and the fifth switch terminal, and wherein the third band elimination filter is connected between the sixth switch terminal and the second terminal.

2. The radio frequency module according to claim 1, wherein the first band elimination filter is a variable band elimination filter.

3. The radio frequency module according to claim 1, wherein the radio frequency module includes bandpass filters and band elimination filters, a number of the bandpass filters being equal to a number of the band elimination filters, or the number of the bandpass filters being lower than the number of the band elimination filters.

4. A communication device comprising:
the radio frequency module according to claim 1; and
an RF-signal processing circuit that is connected to the radio frequency module.

* * * * *